(12) United States Patent
Bell

(10) Patent No.: US 7,629,891 B1
(45) Date of Patent: Dec. 8, 2009

(54) PERSONAL SAFETY CHECK-IN AND FOLLOW-UP SYSTEM AND METHOD

(76) Inventor: Scott Douglas Bell, P.O. Box 19586, Sarasota, FL (US) 34276

( * ) Notice: Subject to any disclaimer, the term of this patent is extended or adjusted under 35 U.S.C. 154(b) by 328 days.

(21) Appl. No.: 11/881,892

(22) Filed: Jul. 30, 2007

(51) Int. Cl.
*G08B 23/00* (2006.01)

(52) U.S. Cl. ............... 340/573.1; 340/573.4; 340/506; 705/5

(58) Field of Classification Search ............ 340/573.1, 340/539.13, 539.1, 539.15, 573.4, 524, 521, 340/522, 506; 705/1, 3, 5, 26; 709/223, 709/224, 225
See application file for complete search history.

(56) References Cited

U.S. PATENT DOCUMENTS

| | | | | |
|---|---|---|---|---|
| 6,617,969 B2 * | 9/2003 | Tu et al. | ...................... | 340/517 |
| 7,047,203 B2 * | 5/2006 | Johnson | ......................... | 705/1 |
| 7,261,690 B2 * | 8/2007 | Teller et al. | ................. | 600/300 |

\* cited by examiner

*Primary Examiner*—Toan N Pham

(57) ABSTRACT

An automated check-in and follow-up membership service, the use of which enhances personal safety. So long as membership is current, the system and method of the service allow a member to create, modify and digitally store member-entered information as a member profile, including specific follow-up contact preference periods. The service then provides the member space within a database in which to store a member-created check-in message, and, in the event timely check-in by the member does not occur, the service provides a series of automated follow-up based on the contact preferences pre-selected by the member. The service could ultimately provide a missing person's report to an appropriate party on a member's behalf, and the member profile information could be used by authorities as an additional tool when searching for a missing person.

24 Claims, 1 Drawing Sheet

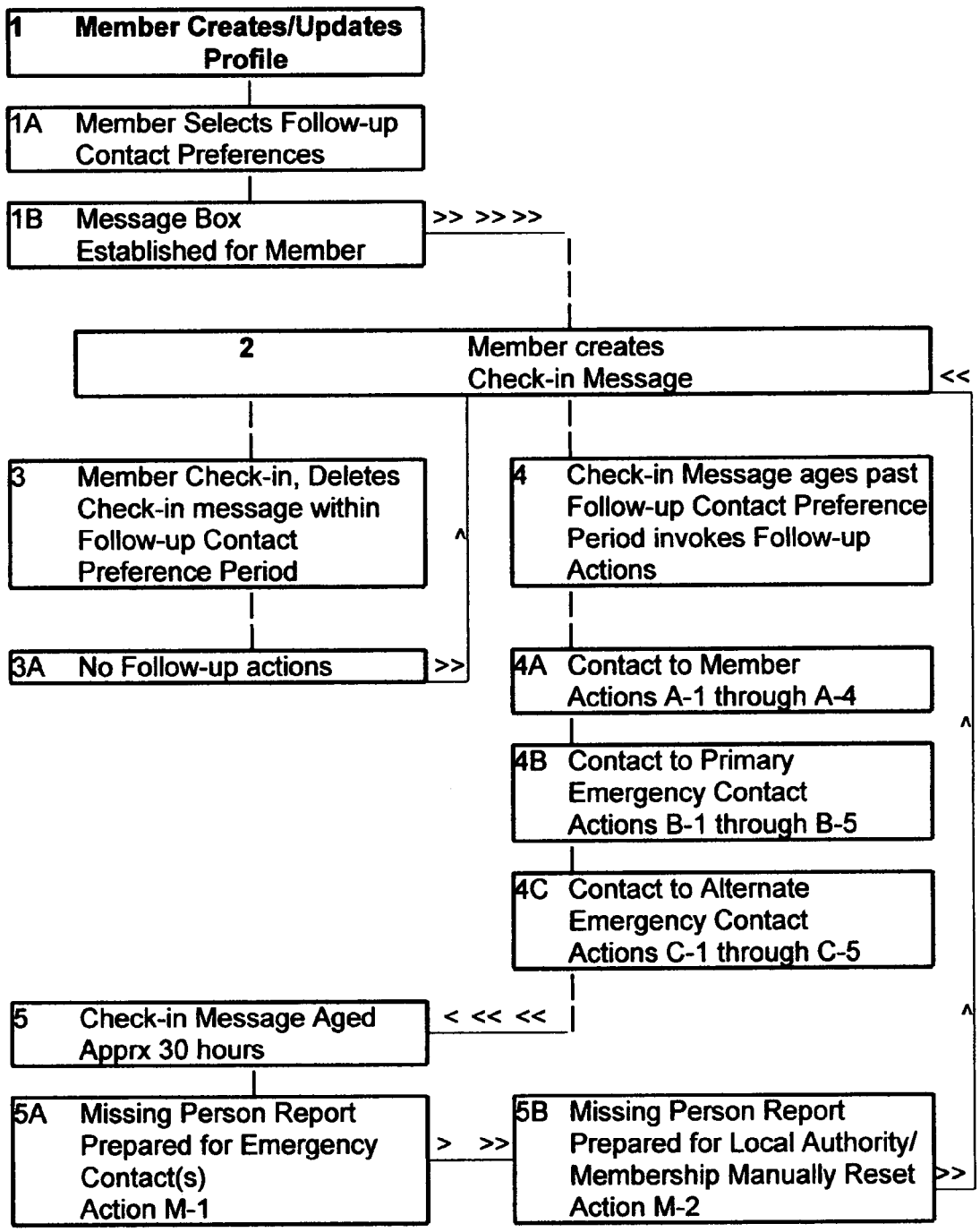

PERSONAL SAFETY CHECK-IN AND FOLLOW-UP SYSTEM AND METHOD

CROSS-REFERENCES TO RELATED APPLICATIONS

None

BACKGROUND

1. Field of the Invention

This invention relates to generally personal safety, specifically to a simple check-in and follow-up service having automated follow-up actions triggered by the inaction of the member according to the member's pre-selected options. Continued inaction by the member beyond a pre-determined time frame results in establishing a missing person report for use by either a member's pre-selected emergency contact or contacts, or by appropriate authorities.

2. Description of the Related Art

People commonly agree that when someone is in trouble, prompt follow-up action is desired and will be more likely to produce a favorable outcome. However, the lack of accurate information needed for follow-up action often impedes timely assistance. Further, authorities are generally reluctant to have someone officially declared as missing, unless probable cause is established. People, especially socially active individuals, often use a verbal message system to communicate their whereabouts within a network of other individuals, such as a college student telling a dorm mate she is going to the movies at 8 pm and should be home by 11 pm. One important disadvantage of this type of verbal message system is that in some instances people may elect not to inform their personal network of friends or relatives about their current circumstances to avoid complicated communications, wherein their safety is placed at risk should follow-up action be required. For example, the college student may not actually be going to the movies, but instead going somewhere else for a date. Then, if she fails to return on time, the friend or dorm mate does not have accurate information to begin follow-up action. Another disadvantage of the verbal message system is that the follow-up action taken is variable, and may include no action at all. The roommate may go to bed, study late and fail to notice the time, or become otherwise preoccupied. Leaving a voice mail, email, or other manual message with an individual can also have varying results, and may result in no action taken for a variety of reasons. Prompt action will not be taken when the individual to whom the manual message is directed does not find it in a timely manner. In addition, the individual may receive the message and then become preoccupied and fail to think about the person who left the message being overdue, which places the person's safety at risk if she has car trouble or is otherwise is in need of assistance. Another risk of leaving a message with an individual is that the individual receiving the manual message may think their friend or relative is perpetually late, and therefore no immediate action is required. As a result of the potential failures noted above, there is a need for a simple system that a person can use to leave a beneficial message and know that pre-determined follow-up actions will automatically and reliably be taken on their behalf to enhance their safety.

The invention disclosed in U.S. Pat. No. 7,047,203 to Johnson (2006) has some of the same features as the present invention, however the Johnson invention appears to be structured for travelers, such as an airline passenger traveling for business and needing to establish an extended and/or frequently changed itinerary. The Johnson invention allows those traveling over longer periods of time to use an itinerary creation and cancellation process to create one or more itineraries at once, and requires setup and validation for each itinerary creation or extension. In contrast, the present invention allows for storage of pre-selected information defined as a member profile and subsequent member creation of check-in messages that are each given a date and time stamp at the time of creation. The present invention service only stores one check-in message at a time for the member that must be canceled before another can be entered. The check-in message is then compared to the member profile and when the check-in message ages past pre-selected follow-up periods in the member profile, the member is automatically reminded that the time period has passed. If no response is received from the member leaving the check-in message, then at least one alternate contact is alerted, and if there is a continued failure of response from the member leaving the check-in message, one or more additional person(s) pre-selected by the member and identified in the member's stored profile, or local authorities, may be contacted to reduce the timeframe for filing a missing person report. Further, the filing of an official missing person report may be expedited, as probable cause for concern will have been established by the history of steps taken by the present invention database and subsequent failure of the member to respond.

A major disadvantage of the Johnson invention for personal/social use is that each transaction in the Johnson invention requires the member to setup a transaction-specific personal identification code along with an individual validation code specific for the itinerary, which is cumbersome. In contrast, the present invention does not require a member to create an additional code for each transaction. Instead the present invention has a member-created reusable code created once in the member profile information, making it easier for a member to recall. A further disadvantage of the Johnson invention is that using data entry to establish a check-in follow-up time allows for data entry error. Conversely, the present invention bases follow-up actions on the database created date/time stamp of the member-created check-in message, which eliminates data entry error. In addition, the present invention has other advantages over the Johnson invention, including a simple single message check-in action by a member or cancellation by the member, whereas Johnson is set up to allow more complex multiple itinerary creations and extensions each requiring specific codes to cancel follow-up actions. The present invention also allows a member to change their static password using a pre-selected question/answer for easier use, whereas Johnson has codes assigned at a transaction level creating possible confusion. Typically, once a member using the present invention creates a profile and stores the pre-determined information, the current invention's simple check-in message database time stamp triggers all follow-up actions, whereas Johnson requires more time for each itinerary creation or cancellation inputs. There is no prior art invention known having all of the same features and advantages of the present invention.

BRIEF SUMMARY OF THE INVENTION

It is the primary objective of this invention to provide an automated check-in and follow-up membership service that enhances personal safety. It is also an objective to provide an automated service that stores current, accurate, and comprehensive member profile information. It is a further objective to provide an automated service allowing for easy and efficient check-in and reliable follow-up actions. It is another objective to provide the beneficial storage of information expediting the initiation of a missing person report on a member's behalf. It is also an objective to provide a personal safety service that in widespread use creates a national database for appropriate authorities to access when searching for a missing person.

The present invention provides an automated personal safety service allowing for storage of pre-selected information defined as a member profile and subsequent member-created check-in messages each given a contemporary date and time stamp when created. A check-in message is then compared to the member profile and when the check-in message ages past pre-selected follow-up periods in the member profile, the service reminds the member the pre-selected time period has passed. If no response is received from the member leaving the check-in message, then at least one alternate contact is alerted, and if there is a continued failure of response from the member who left the check-in message, one or more local authorities may be contacted to reduce the timeframe for filing a missing person report. Thus, the service is efficient and easy to use, and provides reliable predetermined follow-up actions. Also, since a member may at any time modify their profile information, current, accurate, and comprehensive member information is available for follow-up actions by others. Further, since a member profile includes information such as, but not limited to, a member's first, middle and last names; a physical address for the member; a primary telephone number for the member; up to three alternate telephone numbers for the member; the member's primary email address; the member's gender; the month and year of the member's birth; the member's height; the member's approximate weight; the member's hair color; the member's eye color; unique body markings of the member that can be used for identification; the member's Social Security Number; the number of the member's Driver License or state identification card; the number of the member's vehicle license plate; and the year, make, model and color of the member's primary vehicle, there is adequate information to expedite the initiation of a missing person report on a member's behalf. On a larger scale, the present invention could potentially be used to supplement or create a national database useful to appropriate authorities.

BRIEF DESCRIPTION OF THE SEVERAL VIEWS OF THE DRAWINGS

The sole drawing sheet provided is a flow chart showing follow-up actions provided by the present invention service that enhance personal safety.

DETAILED DESCRIPTION OF THE INVENTION

The sole illustration accompanying this invention disclosure is a flowchart comprising a numbered block diagram detailing the steps of a simple and reliable automated message service that enhances personal safety. Block 1 identifies the initial step of a member selecting information to be retained as a member profile by the service. Block 1A identifies the subsequent step of the member selecting follow-up contact preferences to be retained as a member profile by the service for follow-up action, if needed. Block 1B then identifies the step of the service's database creating a place to store a check-in message for the member, with Block 2 identifying the step of the member creating a check-in message that is retained by the service after receiving a contemporary date and time stamp. Block 3 identifies the step of the service allowing a member to delete a check-in message, while Block 3A identifies the steps of the database terminating any required follow-up action and resetting the service back to Block 2 when the member's deleting action in Block 3 occurs within the contact preference period pre-selected by the member as a part of the member's current profile information. In contrast, Blocks 4 and 5 in the Flowchart identify the follow-up actions automatically taken by the service should the member not check-in within the contact preference period. Block 4 identifies the step wherein the database recognizes the time frame established in Block 1A has passed, invoking follow-up actions that are automatically performed by the service and continue in sequence as long as the member fails to check in and delete the outstanding check-in message. Only one check-in message per member can be stored in the database at one time. However, once it is deleted, the member may immediately establish a new check-in message. Block 4A identifies the tier-one automated communication step or steps of the database initiating email and voice contact directed toward the member that reminds the member to take the action required in Block 3. Tier-one communication is typically concluded within a maximum time period of approximately twenty-four hours from the date/time stamp given to the check-in message when it is created by the member. Blocks 4B and 4C then identify the steps wherein the database initiates email and voice contact directed toward the member's pre-selected emergency contact(s) and alternative emergency contact(s), which can be later referenced for clarity of description by the term tier-two automated communication steps or relate to the term automated "take-action" message, that ask the emergency contact(s) and alternate(s) to remind the member to take the check-in message deletion action required in Block 3 to avoid further automated follow-up action by the service's database. Tier-two communication is typically concluded within a maximum time period of approximately six hours from the completion of tier-one communication, with a total time period for combined tier-one and tier-two communication typically not exceeding a maximum of thirty hours. Where no Block 3 action takes place and after all Block 4 follow-up action has been exhausted, Block 5 identifies the step wherein the database recognizes a possible problem with a member's personal safety and invokes the actions of Blocks 5A-B that identify steps wherein the database prepares one or more missing person's report, after which the check-in message deletion action by the member in Block 3 can no longer take place and the member must take alternative action, such as but not limited to the calling of a live operator, for personal information verification and resumption of automated member participation in the service.

In Blocks 1 and 1A, where a member creates or modifies a profile using a communication device connected to the electronic database that includes member information and member-selected follow-up contact preferences, the member is prompted by an electronic database to enter information for storage, including but not limited to: a member profile login name; a member profile password; a member profile secret question to reset a profile password; a message box login identification code; a message box password; a message box secret question to reset a message box password; the member's first, middle and last names; a physical address for the member; a primary telephone number for the member; up to 3 alternate telephone numbers for the member; the member's email address; an alternate email address for the member; the member's gender; the month and year of the member's birth; the member's height; the member's approximate weight; the member's hair color; the member's eye color; unique body markings of the member that can be used for identification;

the member's Social Security Number; the number of the member's Driver License or state identification card; the number of the member's vehicle license plate; the year, make, model and color of the member's primary vehicle; the full name and address for at least one emergency contact, at least one telephone number and at least one email address for one emergency contact; the full name and telephone number of the member's current dentist or where dental records can be found; the full name and telephone number of the member's primary care provider; and any urgent medical condition of the member, such as allergy or required medication. The member is also prompted to select a tier-one follow-up contact preference period and a tier-two follow-up contact preference period, as well as at least one emergency contact. The member is further prompted to select a membership payment method for continued use of the service, such as but not limited to annual, quarterly, or monthly payments. Information stored in the electronic database remains accessible to the member through a variety of communication devices. After the actions in Blocks 1 and 1A are completed, the database establishes a message box for the member where the member can store one outstanding check-in message at a time.

In Block 2, where a member creates a check-in message using a communication device connected to the electronic database, the member enters the message box login identification code and password that are currently registered as a part of the member profile previously referenced in Block 1. Once the database compares the login identification code and password, and recognizes no variation, the member can then begin to create a detailed message (for example, but not limited to, a message relating to their intended whereabouts, the name(s) of a party or parties they may be meeting, and an expected duration) that becomes stored in the message box connected to the database and is subsequently accessible to the member through various communication devices. As an additional safety feature, a voice communication device is preferred for message box connection, as authorship verification is more easily performed and currently more trustworthy than verification techniques available during use of other non-voice communication devices, such as those capable of sending email and/or text messages. A voice recognition software application may be used to verify the member's identity, whereas during the use of non-voice communication devices verification of check-in message authorship may be problematic.

In Block 3, where the member deletes a check-in message, the member uses a communication device connected to the electronic database and the message box login id and password contained within the profile previously referenced in Block 1, to access the message box containing the check-in message referred to in Block 2, and is then prompted to delete the outstanding check-in message, which results in no follow-up actions being taken by the electronic database. The message box is now ready to store a new check-in message, according to the step referred to in Block 2, wherein the options in Blocks 3, 4, and 5 again become available in sequence according to member actions and non-action.

In Block 4, where a member's check-in message ages past the pre-selected member follow-up contact preference period of Block 1A, the electronic database uses a timer to periodically compare whether a member's outstanding check-in message (referred to in Block 2) ages past the follow-up contact preference period of Block 1A, and if it does the electronic database initiates a series of automated time sensitive contact communications that are sent directly to the member and which are based on stored information in the previously mentioned member profile of Block 1, with each contact including a request for the member to complete the step of deleting the check-in message of Block 3. If no response is forthcoming from the member, once again using a timer and determining whether the pending check-in message referred to in Block 2 ages past the member's pre-selected emergency contact follow-up contact preference period, the electronic database initiates a series of automated time sensitive contact communications that are sent to at least one of the member's emergency contacts, requesting each to contact the member and request the member to complete the deletion of the check-in message of Block 3.

In Block 5, again using a timer and once a check-in message referred to in Block 2 ages past approximately 30 hours, the electronic database prepares a missing person's report using any or all available profile information and the check-in message referred to in Block 2, and provides that report in a communication directed to at least one of the member's emergency contacts, and when further action is needed the database may also provide that report to an appropriate local authority.

The following examples of specific follow-up actions are provided below for illustrative purposes. However, it should be understood that other qualifiers and actions can also be considered to be within the scope of the present invention without any change in present invention objective. One illustration involves Block 4A of the Flowchart wherein at least two reminder messages are sent to the member when a check-in message has aged past the member's pre-selected follow-up contact preference period and the member has not checked in as in Block 3 of the Flowchart. The first action A-1 (of the four actions A-1-A-4 identified in Block 4A of the Flowchart) involves the service creating a reminder email message and sending it to the member's primary email address, which reminds the member to check-in to their message box. Once the reminder email message of Action A-1 is sent and logged in the database with a concurrent date and time stamp, a brief waiting period begins, for example a waiting period of approximately ten minutes, which is expected to allow the member sufficient time to receive the reminder email message and check-in as identified in Block 3 of the Flowchart. After this first brief waiting period expires and the member has not checked in, the service then looks for the next available contact method pre-selected by the member within the profile, for example a member's alternate email address. If such an alternative email address for the member is found in the member's profile, the next follow-up action, included in Block 4A of the Flowchart as A-2, involves the service creating a reminder email message and sending it to the member's alternate email address thereby reminding the member to check-in to their message box. Thus, Action A-2 is generally equivalent to Action A-1, with the reminder email message (can be identical to or different from that created in Action A-1) being sent to a different email address. Once the reminder email message of Action A-2 is sent and logged in the database with a contemporary date and time stamp, another brief waiting period, for example fifteen minutes, would allow the member time to receive the reminder email message and check-in as identified in Block 3 of the Flowchart. After the brief waiting period expires and the member has not checked in, the service then looks for the next available contact method pre-selected by the member within the profile, for example a primary contact telephone number. This next action, identified in Block 4A of the Flowchart as Action A-3, involves the service generating a telephone call to the member's primary telephone number and leaving a verbal message reminding the member to check-in to their message box. Once the reminder telephone call of Action A-3 is sent and logged in the database with a contemporary date and time stamp, another brief waiting period, for example fourteen minutes, would allow the member time to receive the reminder telephone call and to check-in as identified in Block 3 of the Flowchart. After the brief waiting period expires and the member has not checked in, the service then looks for the next available contact method pre-selected by the member within the profile, for example an alternate member telephone number. This next action, identified in Block 4A of the Flowchart as A-4, involves the service generating a telephone call to the member's alternate telephone number and leaving a verbal message that reminds the member to check-in to their message box and delete their outstanding check-in message. Action A-4 is generally equivalent to Action A-3. Once the reminder telephone call of Action A-4 is sent and logged in the database with a contemporary date and time stamp, another brief waiting period, for example twelve minutes although all brief waiting periods may have the same or different durations, would allow the member sufficient time to receive the reminder telephone call and to check-in as identified in Block 3 of the Flowchart. After the brief waiting period expires and the member has not checked in, the service then looks for the next available contact method pre-selected by the member within the profile. If no more contact under Block 4A is possible and the member still has not responded and performed the check-in under Block 3, the database automatically moves to the actions of Block 4B. It should be noted that an A-4 Action will not occur if the member only has entered a single primary contact telephone number in the member profile. In the alternative, if the member desires to be contacted at a home telephone number, an office telephone number, and a pager telephone number, then the total of three A-4 Actions would occur after an A-3 Action. Similarly, the number of A-3 Actions taken would depend upon the number of alternate email addresses, if any, provided by the member within the member profile.

Another illustration of follow-up actions taken by the database if a member has an outstanding check-in message and in a timely manner does not perform the member check-in required by Block 3 involves the actions identified in Block 4B of the Flowchart. Where a check-in message has aged past Block 4A of the Flowchart and Actions A-1 through A-4 to reach the member directly have been unsuccessful in producing a member check-in, the service then attempts to reach a primary emergency contact based upon the member profile information and the pre-selected follow-up emergency contact preference period, perhaps consisting of zero to six hours, once Actions A-1 to A-4 have been exhausted. Typically Block 4B of the Flowchart results at a minimum in the following four actions, although not limited thereto. The first action, identified in Block 4B of the Flowchart as Action B-1, involves the service creating a reminder email message and sending it to the primary email address of the primary emergency contact. The reminder email message of Action B-1 is somewhat different from Action A-1 sent to the member, as it advises the primary emergency contact that the member has not checked in and to separately reach out to the member for the purpose of reminding the member to check-in as identified in Block 3 of the Flowchart. Once the reminder email message of Action B-1 is sent and logged in the database with a contemporary date and time stamp, another brief waiting period, for example twenty-one minutes, would allow the primary emergency contact sufficient time to receive the reminder email message and separately reach out to the member reminding the member to check-in as identified in Block 3 of the Flowchart. After the brief waiting period expires and the member has not checked in, the service then looks for the next available contact method pre-selected by the member within the profile, for example a primary telephone number of a primary emergency contact. This next action, identified in Block 4B of the Flowchart as B-2, involves the service generating a telephone call to the primary emergency contact's primary telephone number and leaving a verbal message. Once the reminder telephone call of Action B-2 is sent and logged in the database with a contemporary date and time stamp, another brief waiting period, for example fourteen minutes, would allow the primary emergency contact sufficient time to receive the reminder telephone call and separately reach out to the member reminding the member to check-in as identified in Block 3 of the Flowchart. After the brief waiting period expires and the member has not performed the needed check-in, the service then looks for the next available contact method pre-selected by the member within the profile, for example another alternate email address for the primary emergency contact. This next action, identified in Block 4B of the Flowchart as Action B-3, involves the service creating a reminder email message and sending it to the alternate email address of a primary emergency contact. Action B-3 is generally equivalent to Action B-1, however the reminder email message created in Action B-3 may be different from or identical to the reminder email message created in Action B-1. Once the reminder email message of Action B-3 is sent and logged in the database with a contemporary date and time stamp, another brief waiting period, for example eighteen minutes, would allow the primary emergency contact time to receive the reminder email message and separately reach out to the member reminding the member to check-in as identified in Block 3 of the Flowchart. After the brief waiting period expires and the member has not checked in, the service then looks for the next available contact method. The next action, identified in Block 4B of the Flowchart as Action B-4, involves the service sending a reminder email message to the member's primary email address, thus' making Action B-4 generally equivalent to Action A-1 in Block 4A. However, the reminder email message sent under Action B-4 may be identical to or different from the email message sent in Action A-1. Once the reminder email message of Action B-4 is sent and logged in the database with a contemporary date and time stamp, another brief waiting period, for example nineteen minutes, would allow the member time to receive the reminder email message and to check-in as identified in Block 3 of the Flowchart. After the brief waiting period expires and the member has not checked in, the service then looks for the next available contact method pre-selected by the member within the profile, for example an alternate telephone number of the primary emergency contact. This next action, identified in Block 4B of the Flowchart as B-5, involves the database automatically generating a telephone call to the alternate telephone number of the primary emergency contact and leaving a verbal message generally equivalent to Action B-2, although the exact wording of the verbal message in B-5 may be different from or identical to the verbal message of B-2. Once the reminder telephone call of Action B-5 is sent and logged in the database with a contemporary date and time stamp, another brief waiting period, for example sixteen minutes, would allow the primary emergency contact time to receive the reminder telephone call and separately reach out to the member reminding the member to check-in as identified in Block 3 of the Flowchart. After the brief waiting period expires and the member has not checked in, the service then looks for the next available contact method pre-selected by the member within the profile. If no further options are available within Block 4B, the database would then move to the Actions C-1 through C-5 identified in Block 4C of the Flowchart, which may require contacting the primary email address of an alternate emergency contact. Similar to Action A-4, Actions B-3 and B-5 are optional depending upon whether the member has provided additional alternate email addresses and telephone numbers in the profile. At any time other than when an outstanding check-in message is stored by the database, the member can update profile information, including alternate email addresses and telephone numbers of the member and the member's emergency contacts.

Another illustration of follow-up actions involves Block 4C of the Flowchart wherein as a part of the action identified in Block 4C of the Flowchart as C-1 the database automatically creates a reminder email message and sends it to the primary email address of the alternate emergency contact. Thus, Action C-1 is generally equivalent to Action B-1, although the content of the reminder email message sent may be identical to or different from the reminder email message sent in Action B-1. Once the reminder email message of Action C-1 is sent and logged in the database with a contemporary date and time stamp, another brief waiting period, for example twelve minutes, would allow the alternate emergency contact time to receive the reminder email message and separately reach out to the member reminding the member to check-in as identified in Block 3 of the Flowchart. After the brief waiting period expires and the member has not checked in, the service then looks for the next available contact method pre-selected by the member within the profile, for example the primary telephone number of an alternate emergency contact. This next action, identified in Block 4C of the Flowchart as Action C-2, involves the service generating a telephone call to the primary telephone number of the alternate emergency contact and leaving a verbal message generally equivalent to Action B-2. The content of the verbal message in Action C-5 may be different from or identical to the previous verbal message of Action B-2. Once the reminder telephone call of Action C-2 is sent and logged in the database with a contemporary date and time stamp, another brief waiting period, for example twenty minutes, would allow the alternate emergency contact time to receive the reminder telephone call and separately reach out to the member reminding the member to check-in as identified in Block 3 of the Flowchart. After the brief waiting period expires and the member has not checked in, the service then looks for the member's primary email address. This next follow-up action, identified in Block 4C of the Flowchart as Action C-3, involves the service creating a reminder email message to the member's primary email address, which is generally equivalent to the Actions A-1 in Block 4A and B-4 in Block 4B, although the content of any reminder email message could vary from the others. Once the reminder email message of Action C-3 is sent and logged in the database with a contemporary date and time stamp, a brief waiting period, for example sixteen minutes, would allow the member time to receive the reminder email message and to check-in as identified in Block 3 of the Flowchart. After the brief waiting period expires and the member has not checked in, the service then looks for the next available contact method pre-selected by the member within the profile, for example an alternate email address of the alternate emergency contact. This next action, identified in Block 4C of the Flowchart as Action C-4, involves the service creating a reminder email message and sending it to the alternate email address of the alternate emergency contact. Action C-4 is generally equivalent to Action B-3. Once the reminder email message of Action C-4 is sent to the alternate emergency contact and logged in the database with a contemporary date and time stamp, another brief waiting period, for example fifteen minutes, would allow the alternate emergency contact time to receive the reminder email message and separately reach out to the member reminding the member to check-in as identified in Block 3 of the Flowchart. After the brief waiting period expires and the member has not checked in, the service then looks for the next available contact method pre-selected by the member within the profile, for example an alternate telephone number of the alternate emergency contact. This next action, identified in Block 4C of the Flowchart as Action C-5, involves the service generating a telephone call to the alternate telephone number of the alternate emergency contact and leaving a verbal message generally equivalent to Action B-5. Once the reminder telephone call of Action C-5 is sent and logged in the database with a contemporary date and time stamp, another brief waiting period, for example nine minutes, would allow the alternate emergency contact time to receive the reminder telephone call and separately reach out to the member reminding the member to check-in as identified in Block 3 of the Flowchart. After the brief waiting period expires and the member has not checked in, the service then begins preparation of a missing person report as identified in Block 5A of the Flowchart. Similar to Actions B-3 and B-5, Actions C-1, C-2, C-4, and C-5 are optional and depend on a member's willingness to make them a part of the member profile. As a safety feature of the present invention reminder messages are not interactive, thus preventing any reminder message from being used by the member or others to interrupt the member's pre-selected profile options. Instead, a member is only able to respond by initiating the independent check-in action identified in Block 3 of the Flowchart.

Blocks 5A and 5B of the Flowchart are distinguishable from the follow-up actions in Blocks 4A through 4C of the Flowchart, as the actions in Block 5A and 5B of the Flowchart are interactive. The next action, identified in Block 5A of the Flowchart as Action M-1, is conducted within a maximum timeframe of approximately thirty hours from the database-marked date/time stamp of the original member-created check-in message. As a part of Action M-1, all of the member's profile information stored in the database is reproduced, and a copy of the original check-in message stored in the member's message box is made, which are together compiled into a missing person styled report that is delivered to the member's primary emergency contact and any available alternate emergency contacts. This missing person styled report which can then be used by any contact receiving it as a tool on the member's behalf to begin a formal missing person report with an appropriate local authority. After Action M-1 is commenced, routine automated message box check-in under Block 3 of the Flowchart by the member is no longer available, thus requiring alternate action, such as a live operator contact with the member for identity verification in order to resume automated member participation in the service. In the event a member's emergency contact or contacts are unavailable, the last follow-up action identified in Block 5B of the Flowchart as Action M-2 is taken on the member's behalf, wherein the service directly communicates with appropriate local authorities for the purpose of filing an official missing person report. Once Action M-2 occurs, the member's membership in the service and database access must be manually reset.

The description herein provides preferred embodiments of the present invention but should not be construed as limiting in scope. For example, variations in the different features of the invention other than those shown and described herein, may be incorporated into the present invention. Thus, the scope of the present invention should be determined by the

I claim:

1. A method for enhancing the personal safety of a user, said method comprising the steps of:
   providing a database having a capability to accept and store personal information from the user as a user profile, a capability to accept and store user-selected follow-up contact preferences including at least one follow-up contact preference period, a capability to establish a message box for the user, a capability to accept one check-in message from the user and store said check-in message in said message box, a capability to apply a contemporary date and time stamp to said check-in message when it is stored, a capability to accept user deletion of said check-in message, a capability to deny user deletion of said check-in message, a capability to age said check-in message by comparing elapsed time from said date and time stamp to said at least one follow-up contact preference period, a capability to send automated reminder messages, and a capability to prepare and send reports;
   also providing at least one communication device adapted for user exchange of information with said database;
   the user employing said at least one communication device to contact said database and provide personal information to said database;
   said database storing said personal information as the user profile;
   the user employing said at least one communication device to contact said database and provide follow-up contact preferences to said database, including at least one follow-up contact preference period;
   said database storing an emergency contact preferences;
   said database creating the message box for the user;
   the user employing said at least one communication device to contact said database and provide said database with a user-created check-in message;
   said database storing said check-in message in said message box created for the user and applying a contemporary date and time stamp to said check-in message when it is stored;
   said database accepting said user deletion of said check-in message and thereafter allowing said user to create another check-in message; and
   until acceptance of said user deletion step, said database aging said check-in message by comparing elapsed time from said date and time stamp to said at least one follow-up contact preference period, and when said elapsed time exceeds said at least one follow-up contact preference period, said database sending an automated reminder message to the user using said at least one communication device.

2. The method of claim 1 wherein said database sends more than one automated reminder message to the user.

3. The method of claim 1 further comprising a step of said database allowing the user to modify said user profile.

4. The method of claim 1 wherein said database further comprises a capability to communicate with more than one user at a time, the capability to issue user passwords, a capability to accept and store user-created passwords, a capability to accept payment from the users to establish user membership, and a capability of verifying said user membership, and said method further comprises the steps of said database accepting communication from the users and sending reminder messages to the users only after membership status is verified.

5. The method of claim 1 wherein said automated reminder message includes a request for the user to delete said check-in message in said message box for the user.

6. The method of claim 1 wherein said emergency contact preferences stored for said user include at least one emergency contact person, said method further comprises the step of providing at least one additional communication device adapted for exchange of communication between said database and said at least one emergency contact person, and in addition said method further comprises the step of said database using said additional communication device to send at least one automated take-action message to said at least one emergency contact person when said elapsed time exceeds said at least one follow-up contact preference period, with said step of said database sending at least one automated take-action message to said at least one emergency contact person occurring later in time than said step of said database sending at least one automated reminder message to the user.

7. The method of claim 6 wherein said database sending said at least one reminder message to the user is designated a tier-one communication and said database sending said at least one take-action message to said at least one emergency contact person is designated a tier-two communication, and said tier-one is conducted within a maximum time period of approximately twenty-four hours from said date and time stamp of said check-in message and said tier-two communication is conducted within a minimum time period of zero hours and a maximum time period of approximately six hours from completion of said tier-one communication, with a combined time periods of said tier-one communication and said tier-two communication not exceeding approximately thirty hours from said date and time stamp of said check-in message.

8. The method of claim 7 wherein said tier-two communication further comprises said database providing at least one reminder message to the user.

9. The method of claim 6 wherein said automated take-action message includes a request for said at least one emergency contact person to contact the user and ask the user to delete said check-in message in said message box for the user.

10. The method of claim 6 wherein said database further comprises a capability to recognize when both said elapsed time has exceeded a time period of approximately thirty hours and said deletion step still has not occurred, and said method further comprising the steps of said database preparing a missing person report and sending said missing person report to said at least one emergency contact person when said elapsed time has exceeded a time period of approximately thirty hours and said deletion step still has not occurred.

11. The method of claim 10 where said missing person report includes information stored in said user profile of the user and also includes a copy of said un-deleted check-in message.

12. The method of claim 10 further comprising a step of said database denying user deletion of said check-in message after said missing person report is sent to said at least one emergency contact person.

13. The method of claim 10 wherein said database sends said missing person report to said at least one emergency contact person with a request that said at least one emergency contact person send a reply to said database acknowledging that said missing person report has been received, and if no such acknowledgment is received, said method further comprising a steps of said database preparing and sending said missing person report to at least one local authority.

14. The method of claim 1 wherein said step of the user creating said check-in message and said step of the user deleting said check-in message the user employs a voice communication device to communicate with said database.

15. The method of claim 1 wherein said database further comprises a capability to issue at least one message box login number, a capability to accept and store login numbers created by the user, and a capability to verify said at least one message box login number prior to allowing the user access to said message box created for the user.

16. The method of claim 15 wherein said database further comprises a capability to accept and store at least one personal identification number provided by the user and associated with said at least one communication device, and a capability to verify said at least one personal identification number prior to allowing the user access to said message box created for the user, and further wherein said step of the user gaining access to said message box created by the database for the user to create the check-in message and said step of the user gaining access to said message box created by the database for the user to delete said check-in message each further comprise the user employing said message box login number and also employing said personal identification number.

17. The system of claim 1 wherein said database further comprises a capability to communicate with more than one user at a time, a capability to issue user passwords, a capability to accept and store user-created passwords, a capability to accept payment from users to establish user membership, and a capability of verifying said user membership, and wherein said database accepts communication from users and sends reminder messages to users only after membership status is verified.

18. The system of claim 1 wherein said emergency contact preferences stored for said user include at least one emergency contact person and said system further comprises at least one additional communication device adapted for exchange of communication between said database and said at least one emergency contact person so that said database can use said additional communication device to send at least one automated take-action message to said at least one emergency contact person when the user has not deleted said check-in message within said at least one follow-up contact preference period said database sends at least one automated take-action message to said at least one emergency contact person.

19. The system of claim 18 wherein said database further comprises a capability to recognize when said elapsed time has exceeded a time period of approximately thirty hours and the user still has not deleted said check-in message and thereafter prepare and send a missing person report to said at least one emergency contact person, with said missing person report including information stored in said user profile of the user and a copy of said un-deleted check-in message.

20. The system of claim 19 wherein said database further comprises a capability of sending said missing person report to said at least one emergency contact person with a request that said at least one emergency contact person send a reply to said database acknowledging that said missing person report has been received, and if no such acknowledgment is received, preparing and sending said missing person report to at least one local authority.

21. A personal safety enhancing system comprising:
a database having a capability to accept and store personal information from a user as a user profile, a capability to accept and store user-selected follow-up contact preferences including at least one follow-up contact preference period, a capability to establish a message box for the user, a capability to accept one check-in message from the user and store said check-in message in said message box, a capability to apply a contemporary date and time stamp to said check-in message when it is stored, a capability to accept user deletion of said check-in message, a capability to deny user deletion of said check-in message, a capability to age said check-in message by comparing elapsed time from said date and time stamp to said at least one follow-up contact preference period, a capability to send automated reminder messages, and a capability to prepare and send reports; and
at least one communication device adapted for user exchange of information with said database wherein when the user employs said at least one communication device to contact said database and provide to said database personal information and follow-up contact preferences including at least one follow-up contact preference period, said database creates said message box for the user that stores said check-in message and assigns said check-in message said contemporary date and time stamp at the time of creation, and when the user does not delete said check-in message within said at least one follow-up contact preference period, said database sends an automated reminder message to the user using said at least one communication device.

22. The system of claim 21 wherein said database further comprises a capability of allowing the user to only access said message box with a voice communication device.

23. The system of claim 21 wherein said database further comprises a capability to issue at least one message box login number, the capability to accept and store login numbers created by the user, and the capability to verify said at least one message box login number prior to allowing the user access to said message box created for the user.

24. The system of claim 23 wherein said database further comprises a capability to accept and store at least one personal identification number provided by the user and associated with said at least one communication device, a capability to verify said at least one personal identification number prior to allowing the user access to said message box created for the user, and a capability of requiring the user to employ said message box login number and said personal identification number before the user is able to gain access to said message box created by the database for the user.

* * * * *